United States Patent
Huang et al.

(10) Patent No.: US 11,120,948 B2
(45) Date of Patent: Sep. 14, 2021

(54) ELECTROLYTE FOR ALUMINUM ELECTROLYTIC CAPACITOR AND ALUMINUM ELECTROLYTIC CAPACITOR USING ELECTROLYTE

(71) Applicant: Shenzhen Capchem Technology Co., Ltd., Shenzhen (CN)

(72) Inventors: Liqing Huang, Shenzhen (CN); Yun Jia, Shenzhen (CN); Fengliang Huang, Shenzhen (CN); Mingjie Wang, Shenzhen (CN)

( * ) Notice: Subject to any disclaimer, the term of this patent is extended or adjusted under 35 U.S.C. 154(b) by 440 days.

(21) Appl. No.: 16/055,172

(22) Filed: Aug. 6, 2018

(65) Prior Publication Data

US 2018/0342356 A1 Nov. 29, 2018

Related U.S. Application Data

(63) Continuation of application No. PCT/CN2016/113058, filed on Dec. 29, 2016.

(30) Foreign Application Priority Data

Sep. 19, 2016 (CN) .......................... 201610831418.6

(51) Int. Cl.
*H01G 9/035* (2006.01)
*H01G 9/145* (2006.01)

(52) U.S. Cl.
CPC .............. *H01G 9/035* (2013.01); *H01G 9/145* (2013.01)

(58) Field of Classification Search
CPC ............................... H01G 9/035; H01G 9/145
See application file for complete search history.

(56) References Cited

U.S. PATENT DOCUMENTS

| 6,093,408 A | * | 7/2000 | Hasenoehrl | A61K 8/585 |
| | | | | 424/401 |
| 7,460,357 B2 | | 12/2008 | Takeda et al. | |
| 7,539,006 B2 | | 5/2009 | Komatsu et al. | |
| 2016/0148756 A1 | * | 5/2016 | Wada | H01G 11/64 |
| | | | | 252/62.2 |

FOREIGN PATENT DOCUMENTS

| CN | 1529892 A | | 9/2004 |
| CN | 101261900 A | | 9/2008 |
| CN | 101556867 A | | 10/2009 |
| CN | 101840786 A | | 9/2010 |
| CN | 1744247 | * | 3/2011 |
| CN | 104882282 A | | 9/2015 |

OTHER PUBLICATIONS

Internation Search Report of PCT/CN2016/113058, dated Apr. 27, 2017.

* cited by examiner

*Primary Examiner* — Matthew E. Hoban

(57) ABSTRACT

An electrolyte for an aluminum electrolysis capacitor and the aluminum electrolysis capacitor using the electrolyte are provided. The electrolyte comprises a primary solute, a primary solvent, and an additive as shown in a structural formula 1, wherein, $R_1$ and $R_2$ are each independently selected from —$CH_3$, —$CH_2CH_3$ or —OH; $R_3$ and $R_4$ are each in selected from —$(CH_2CH_2O)mH$ or —H, and n and m are integrals ranging from 1 to 10000, respectively. The electrolyte has excellent anti-corrosive performance and is capable of maintaining long load service life under the condition of relatively high chlorine ion content, and there is no evidence of corrosion in the capacitor after it is disassembled.

17 Claims, No Drawings

ELECTROLYTE FOR ALUMINUM ELECTROLYTIC CAPACITOR AND ALUMINUM ELECTROLYTIC CAPACITOR USING ELECTROLYTE

CROSS-REFERENCE TO RELATED APPLICATIONS

This application is a continuation of International Patent Application No. PCT/CN2016/113058 with a filing date of Dec. 29, 2016, designating the United States, now pending, and further claims priority to Chinese Patent Application No. 201610831418.6 with a filing date of Sep. 19, 2016. The content of the aforementioned applications, including any intervening amendments thereto, are incorporated herein by reference.

TECHNICAL FIELD

The disclosure relates to the technical field of aluminum electrolysis capacitors, and particularly to an electrolyte for an aluminum electrolysis capacitor and the aluminum electrolysis capacitor using the electrolyte.

BACKGROUND OF THE PRESENT INVENTION

Anticorrosion of an aluminum electrolysis capacitor mainly aims at preventing corrosion of chlorine ions. In the process of manufacturing or washing the aluminum electrolysis capacitor, or in raw materials of the aluminum electrolysis, organic chlorine or chlorine ions are introduced. During the long term use of the capacitor, chlorine ions are dissociated from organic chlorine and gathered at a weak position of a positive oxide film, thereby easily causing corrosion to the positive aluminum foil and leads so as to result in failure of the capacitor.

An electrolyte anti-corrosive agent is an additive which is capable of capturing $Cl^-$ to form a complex with $Cl^-$ to be deposited on to surface of the aluminum foil to protect and prevent the aluminum foil form being corroded, is capable of inhibiting elution of $Al^{3+}$ and plays a role in blocking metal ions. The Chinese patent No. 201010197158 disclosed an anti-corrosive agent selecting one or more from nitryl boron trinitride, 8-hydroxyquinoline, ethylenediamine tetraacetic acid, nitrilotriacetic acid and silver citrate. However, amounts of these anti-corrosive addition agents that can be added are few, below 1%, excessive addition amount can cause other adverse effects, and therefore, an anti-corrosive effect is not significantly obvious.

Nitryl triazaborane is capable of capturing $Cl^-$ to thrill a molecular compound. However, at room temperature, nitryl triazaborane is volatile and is easily hydrolyzed to generate hydrogen, ammonia and boric acid. In the storage process, nitryl triazaborane is prone to explosion under the irradiation of light. This product has polarity and is extremely strong in reactivity, and hydrogen atoms in this product can be replaced by many organic hydrocarbons and aromatic hydrocarbons. The addition amount of 8-hydroxyquinoline can not exceed 1%, or else, explosion-proof performance will be influenced.

8-hydroxyquinoline can form a complex with elated $Al^{3+}$. Amino polyeatboxyiic compounds, such as ethylenediamine tetraacetic acid and nitrilotracetic acid, are complexing agents, which act with $Cl^-$ to generate complexes and are capable of inhibiting elution of $Al^{3+}$. However, ethylenediamine tetraacetic acid cannot be added excessively, if addition amount is excessive, a guide pin will become black when being immersed therein. Nitrilotracetic acid is a strong acid among tribasic acids, which has a certain corrosion effect on an aluminum oxide protection film, and after addition, leak current of the capacitor is increased.

Silver citrate forms an AgCl sediment with $Cl^-$. However, since silver compounds are small in solubility and dissolved quantity and contain noble metal silver, they are expensive in cost, and are rarely used in practice.

SUMMARY OF PRESENT INVENTION

The disclosure provides an electrolyte for an aluminum electrolysis capacitor and the aluminum electrolysis capacitor using the electrolyte. The electrolyte has good anti-corrosive performance, is capable of maintaining long load service life under the condition of relatively high chlorine ion content, and there is no evidence of corrosion in the capacitor after it is disassembled.

According to a first aspect of the disclosure, the disclosure provides an electrolyte for an aluminum electrolysis capacitor, comprising a primary solute, a primary solvent, and an additive as shown in structural formula 1.

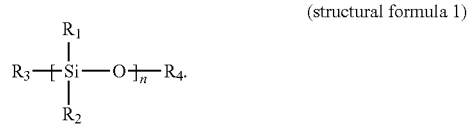
(structural formula 1)

Wherein, $R_1$ and $R_2$ are each independently selected from $—CH_3$, $—CH_2CH_3$ or $—OH$; $R_3$ and $R_4$ are each independently selected from $—(CH_2CH_2O)mH$ or $—H$, wherein, n and m are integrals ranging from 1 to 10000, respectively.

Further, content of the above additive in the above electrolyte is 5%-10% of the total mass of the above electrolyte.

Further, the above additive is a substance as shown in compound 1,

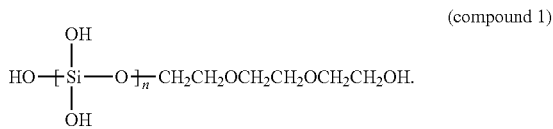
(compound 1)

Further, the above primary solute is an ammonium salt of branched dicarboxylic 1,4-DDA; and the above primary solvent is ethylene glycol.

Further, the above electrolyte further comprises a cooperation solute; preferably, the cooperation solute is linear dicarboxylic ammonium sebacate.

Further, the above electrolyte further comprises a solvent stabilizer; preferably, the above solvent stabilizer is an ethylene glycol polymer, and more preferably, diethylene glycol or polyethylene glycol.

Further, the above electrolyte further comprises a formation improver; preferably, the above formation improver is ammonium hypophosphite.

Further, the above electrolyte further comprises a hydrogen absorption agent, preferably, the above hydrogen absorption agent is a nitrobenzene compound, and more preferably, p-nitrobenzene methanol.

According to a second aspect of the disclosure, the disclosure provides an aluminum electrolysis capacitor, comprising the electrolyte described in the first aspect.

Further, a voltage of the above aluminum electrolysis capacitor is in a range of of 450-500V.

The electrolyte of the disclosure contains the additive as shown in structural formula 1, has strong anti-corrosive performance, and is capable of maintaining long load service life under the condition of relatively high chlorine ion content. It has been proved that, after 5 ppm chlorine ions are added in the aluminum electrolysis capacitor of 450-500V, the capacitor runs for 5000 hours at 105° C. with good performance; and there is no evidence of corrosion in the capacitor after it is disassembled.

DETAILED DESCRIPTION OF PREFERRED EMBODIMENTS

The disclosure will be further described, in detail hereinafter with reference to the accompanying drawings, in which exemplary embodiments of the disclosure are shown.

In view of various aspects such as solubility, destruction on electrical performance and cost, the existing anti-corrosive additive cannot be excessively added, and the electrolyte is unobvious in anti-corrosive effect and only has an effect of delaying corrosion. At present, there is no electrolyte for a 450-550V aluminum electrolysis capacitor available in the market, which has an obvious anti-corrosive effect.

The disclosure finds that an additive as shown in structural formula 1 is capable of obviously improving the anti-corrosive effect of the electrolyte. In the additive as shown in structural formula 1, $R_1$ and $R_2$ are each independently selected from —$CH_3$, —$CH_2CH_3$ or —OH; $R_3$ and $R_4$ are each independently selected from —$(CH_2CH_2O)mH$ or —H, and n and m are integrals ranging from 1 to 10000, respectively. It has been proved that the number of carbon atoms of groups in each of $R_1$ and $R_2$ should not be excessive, or else, the anti corrosive performance will be influenced. The inventor proves that under the condition that the number of carbon atoms of groups in each of $R_1$ and $R_2$ is 1 or 2, or $R_1$ and $R_2$ are each independently —OH, the anti-corrosive performance is excellent, and under the condition that the number of carbon atoms of groups in each of $R_1$ and $R_2$ is more than 2, the performance is reduced.

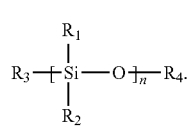

(structural formula 1)

In one embodiment of the disclosure, the electrolyte for an aluminum electrolysis capacitor according to the disclosure comprises a primary solute, a primary solvent, and an additive as shown in structural formula

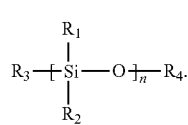

(structural formula 1)

Wherein, $R_1$ and $R_2$ are each independently selected from —$CH_3$, $CH_2CH_3$ or OH; $R_3$ and $R_4$ are each independently selected from —$(CH_2CH_2O)mH$ or —H, and n and m are integrals ranging from 1 to 10000, respectively.

In the disclosure, the additive as shown in structural formula 1 is a surfactant which has an oleophilic and hydrophobic non-polar carbon chain end and a hydrophilic and oleophobic polar end, the hydrophilic end performs adsorption on the surface of an oxide film, and the oleophilic end outwardly prevents other groups from invading, and thus is capable of preventing other ions from corroding the oxide film and meanwhile improving the withstanding voltage of the oxide film.

In the disclosure, due to specific property of its surfactant, the additive as shown in structural formula 1 can be largely dissolved in the electrolyte. However, excessive addition can influence repair of the oxide film to cause overlarge placement leak current and overlarge loss tangent angle. By virtue of test, it is found that 0%-10% of addition amount leads to the best effect, while less than 5% of addition amount leads to the reduction of the anti-corrosive effect, and more than 10% of addition amount leads to overlarge loss tangent angle, which are not beneficial to achievement of excellent comprehensive performance.

In one embodiment of the disclosure, the additive is a substance as shown in compound 1,

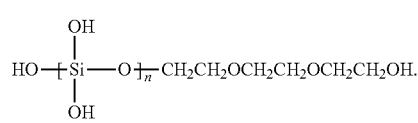

(compound 1)

In one embodiment of the disclosure, the primary solute is an ammonium salt of branched dicarboxylic 1,4-DDA; and the primary solvent is ethylene glycol.

In order to improve the stability of the solute, in one embodiment of the disclosure, the electrolyte further comprises a cooperation solute; and the cooperation solute can be linear dicarboxylic ammonium sebacate.

In order improve the stability of the solvent, in one embodiment of the disclosure, the electrolyte further comprises a solvent stabilizer; and the solvent stabilizer can be an ethylene glycol polymer, for example, diethylene glycol or polyethylene glycol.

In order to improve formation efficiency and reduce leak current, in one embodiment of the disclosure, the electrolyte further comprises a formation improver; and the formation improver can be phosphate, for example, ammonium hypophosphite.

In order to reduce the dropped bottom of the capacitor, in one embodiment of the disclosure, the electrolyte further comprises a hydrogen absorption agent; and the hydrogen absorption agent can be a nitrobenzene compound, for example, p-nitrobenzene methanol.

In one preferred embodiment of the disclosure, the ammonium salt of branched dicarboxylic 1,4-DDA is used as the primary solute, and linear dicarboxylic ammonium sebacate is used as the cooperation solute, so as to improve the stability of the solute: ethylene glycol is used as the primary solvent, and the ethylene glycol polymer, such as diethylene glycol or polyethylene glycol 1000, is used as the solvent stabilizer; phosphate such as ammonium hypophosphite is used as the formation improver to improve the formation efficiency and reduce leak current; the nitrobenzene compound, such as p-nitrobenzene methanol, is used as the hydrogen absorption agent to reduce the dropped bottom of the capacitor. Optimization of an electrolyte formula allows the performance of the capacitor corresponding to the electrolyte to achieve a good level.

The voltage or the aluminum electrolysis capacitor using the electrolyte of the disclosure can reach 450-500V, while the additive in prior art still cannot achieve such a high-voltage aluminum electrolysis capacitor.

The electrolyte of the disclosure contains the additive as shown in structural formula 1, has strong anti-corrosive performance, and is capable of maintaining long load service life under the condition of relatively high chlorine ion content. It has been proved that after 5 ppm chlorine ions are added in the aluminum electrolysis capacitor or 450-500V, the capacitor runs for 5000 hours at 105° C. with good performance; and there is no evidence of corrosion in the capacitor after it is disassembled.

The additive in the disclosure is a silicon-containing organic compound having a specific structure, which can form a molecular compound with Cl⁻, and therefore has an anti-corrosive function. After Cl⁻ is introduced, Cl⁻ moves toward a positive pole, after the additive captures Cl⁻, an active group in the molecule is substituted with Cl⁻ form a stable molecular compound, thereby preventing Cl⁻ from corroding the aluminum oxide film.

The additive of the disclosure can be prepared by heating and reacting 1-5 substances as shown in structural formula 2 for 1-6 days in the presence of a solvent and a catalyst and then removing low-boiling-point substances at a reduced pressure.

The substance as shown in structural formula 2 is a silane coupling agent whose molecular general formula is, as follows:

(structural formula 2)

wherein, X is a hydrolysable group; Y is an organic functional group which can react with resin, X is generally methoxyl, ethyoxyl, methoxylethyoxyl, acetoxyl or the like, and these groups generate silanol $Si(OH)_3$ when hydrolyzed. Y is generally a combined group of vinyl, amino, epoxy, methylacryloyloxyl, sulfydryl, methoxyl, ethyoxyl or carbamido with $(CH_2)_n$ (n=0~3).

The solvent may be water or an organic solvent or a mixture thereof, and the organic solvent may be ketone, ester and alcohol solvents or other solvents, preferably, be an alcohol solvent, such as propanol, ethylene glycol, diethylene glycol and butanol.

The catalyst may be acids or alkalis, and may be either organic acids, such as acetic acid and propanoic acid, or inorganic acids, such as phosphoric acid and boric acid, or alkalis substances, such as organic amine and ammonium hydroxide.

The disclosure will be described in detail with reference to embodiments below. It should be understood that embodiments are only illustrative and do not limit the protection scope of the disclosure.

The additive used in the following embodiments is compound 1 as follows:

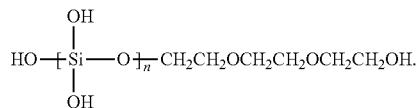

(compound 1)

The method for preparing the additive is as follows: 40 parts of γ-glycidyl ether oxypropyl trimethoxysilane, 10 parts of tetramethoxysilane and 7 parts of dimethoxysilane as well as solvents 33 parts of ethylene glycol, 7 parts of water and 3 parts of boric acid are heated together to 80-90° C. to react for 2 days, then the temperature is preserved, and low-boiling-point substances are removed in vacuum to obtain a sticky substance that mainly contains a component compound 1, and may also contain some reactants or some generated low-boiling-point substances, which are not removed. In this embodiment, A represents compound 1.

In HS-451 electrolytes, the anti-corrosive additives A are added with the contents being 5%, 10% and 15% respectively. All the electrolytes are added with 5 ppm Cl⁻ for an acceleration test. Capacitors of 450V 330 μf and φ30*45 are made to be aged for an acceleration service life test at 105° C. The test is performed once every 500 H after 0 H, 250 H and 500 H. 20 capacitors are made in each batch. One capacitor is stripped to observe whether corrosion exists after test is ended each time. If there is failure of the capacitor, the capacitor is disassembled to for observation as well.

Specific compositions and content of HS-451A+5% A, HS-451A+10% A and HS-451A+15% A electrolytes are shown in Tables 1-3.

TABLE 1

| HS-451A + 5% A electrolyte | | | |
|---|---|---|---|
| Number | Raw material | Content | Tolerance |
| 1 | Ethylene glycol | 68.25% | ±2% |
| 2 | Polyethylene glycol 1000 | 5% | ±0.5% |
| 3 | Ammonium sebacate | 4.00% | ±0.5% |
| 4 | 1,4-DDA ammonium EG solution | 15% | ±1% |
| 5 | PVA105 | 2% | ±0.5% |
| 6 | Additive A | 5.0% | ±0.5% |
| 7 | Ammonium hypophosphite | 0.25% | ±0.1% |
| 8 | p-nitrobenzene methanol | 0.50% | ±0.08% |

TABLE 2

| HS-451A + 10% A electrolyte | | | |
|---|---|---|---|
| Number | Raw material | Content | Tolerance |
| 1 | Ethylene glycol | 63.25% | ±2% |
| 2 | Polyethylene glycol 1000 | 5% | ±0.5% |
| 3 | Ammonium sebacate | 4.00% | ±0.5% |
| 4 | 1,4-DDA ammonium EG solution | 15% | ±1% |
| 5 | PVA105 | 2% | ±0.5% |
| 6 | Additive A | 10.0% | ±0.5% |
| 7 | Ammonium hypophosphite | 0.25% | ±0.1% |
| 8 | p-nitrobenzene methanol | 0.50% | ±0.08% |

TABLE 3

HS-451A + 15% A electrolyte

| Number | Raw material | Content | Tolerance |
|---|---|---|---|
| 1 | Ethylene glycol | 58.25% | ±2% |
| 2 | Polyethylene glycol 1000 | 5% | ±0.5% |
| 3 | Ammonium sebacate | 4.00% | ±0.5% |
| 4 | 1,4-DDA ammonium EG solution | 15% | ±1% |
| 5 | PVA105 | 2% | ±0.5% |
| 6 | Additive A | 15.0% | ±0.5% |
| 7 | Ammonium hypophosphite | 0.25% | ±0.1% |
| 8 | p-nitrobenzene methanol | 0.50% | ±0.08% |

Before $Cl^-$ is added, parameters a the electrolyte are as shown in Table 4.

TABLE 4 parameters or the electrolyte

| | Electrolyte | | | |
|---|---|---|---|---|
| | HS-451A | HS-451A + 5% A | HS-451A + 10% A | HS-451A + 15% A |
| Conductivity (ms/cm, 30° C.) | 1.64 | 1.60 | 1.56 | 1.52 |
| pH | 6.55 | 6.74 | 6.98 | 7.1 |
| Flash point (V) | 521 | 530 | 535 | 538 |
| Water (%) | 3.4 | 3.1 | 3.0 | 3.1 |

Corrosion and failure result records are as shown in Table 5. It can be seen from Table 5 that after the anti-corrosive additive A is added, corrosion is delayed. After different contents of A are added, the anti-corrosive effects are as follows: 15%>10%>5%. However, alter 15% of A is added, failure occurs because of large loss tangent angle under the condition of load for 6500 H at the temperature of 115° C.

TABLE 5

Comparison of anti-corrosive effects of the capacitor

| | | $Cl^-$ content | | | |
|---|---|---|---|---|---|
| | | 5 ppm | 5 ppm | 5 ppm | 5 ppm |
| | | Electrolyte | | | |
| | | HS-451A | HS-451A + 5% A | HS-451A + 10% A | HS-451A + 15% A |
| load time at 105° C. | 250H | — | — | — | — |
| | 500H | — | — | — | — |
| | 1000H | — | — | — | — |
| | 1500H | — | — | — | — |
| | 2000H | — | — | — | — |
| | 2500H | corrosion*3 | — | — | — |
| | 3000H | corrosion*1 | — | — | — |
| | 3500H | — | — | — | — |
| | 4000H | — | — | — | — |
| | 4500H | — | — | — | — |
| | 5000H | — | — | — | — |
| | 5500H | — | corrosion * 1 | — | — |
| | 6000H | — | — | — | — |
| | 6500H | — | — | — | — |
| | 7000H | — | — | — | — |
| | 7500H | — | — | — | — |
| load time at 115° C. | 250H | — | — | — | — |
| | 1000H | corrosion*1 | — | — | — |
| | 1500H | — | — | — | — |
| | 2000H | — | — | — | — |
| | 2500H | corrosion*3 | — | — | — |
| | 3000H | — | — | — | — |
| | 3500H | — | — | — | — |
| | 4000H | — | — | — | — |
| | 4500H | — | corrosion*2 | — | — |
| | 5000H | — | corrosion*1 | — | — |
| | 5500H | — | corrosion*1 | corrosion*1 | corrosion*1 |
| | 6000H | — | corrosion*1 | — | — |
| | 6500H | — | — | DF high*2 | DF high*4 |

The above contents are further detailed descriptions to the disclosure combination with embodiments, and should not be considered that the embodiments of the disclosure are only limited to these descriptions. Several simple derivations or substitutions may also be obtained by those of ordinary skill in the art without departing from the concept of the disclosure, and all of them should be deemed to be included in the protection scope of the invention.

We claim:

1. An electrolyte for an aluminum electrolysis capacitor, comprising a primary solute, a primary solvent, and an additive as shown in structural formula 1,

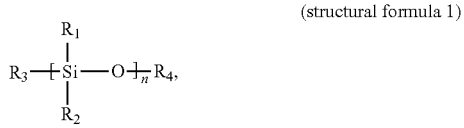
(structural formula 1)

wherein, $R_1$ and $R_2$ are each independently selected from —$CH_3$, —$CH_2CH_3$ or —OH; $R_3$ and $R_4$ are each independently selected from —$(CH_2CH_2O)mH$ or —H, and n and m are integrals ranging from 1 to 10000, respectively.

2. The electrolyte according to claim 1, wherein, content of the additive in the electrolyte is 5%-10% of the total mass of the electrolyte.

3. The electrolyte according to claim 1, wherein, the primary solute is an ammonium salt of branched dicarboxylic 1,4-DDA; the primary solvent is ethylene glycol.

4. The electrolyte according to claim 1, wherein, the electrolyte further comprises a cooperation solute.

5. The electrolyte according to claim 1, wherein, the electrolyte further comprises a solvent stabilizer.

6. The electrolyte according to claim 1, wherein, the electrolyte further comprises a formation improver.

7. The electrolyte according to claim 1, wherein, the electrolyte further comprises a hydrogen absorption agent.

8. An aluminum electrolysis capacitor, comprising the electrolyte according to claim 1.

9. The aluminum electrolysis capacitor according to claim 8, wherein, a voltage of the aluminum electrolysis capacitor is in a range of 450-500V.

10. The electrolyte according to claim 4, wherein, the cooperation solute is linear dicarboxylic ammonium sebacate.

11. The electrolyte according to claim 5, wherein, the solvent stabilizer is an ethylene glycol polymer.

12. The electrolyte according to claim 5, wherein, the solvent stabilizer is an diethylene glycol or polyethylene glycol.

13. The electrolyte according to claim 6, wherein, the formation improver is ammonium hypophosphite.

14. The electrolyte according to claim 7, wherein, the hydrogen absorption agent is a nitrobenzene compound.

15. The electrolyte according to claim 7, wherein, the hydrogen absorption agent is a p-nitrobenzene methanol.

16. An electrolyte for an aluminum electrolysis capacitor, comprising a primary solute, a primary solvent, and an additive as shown in compound 1,

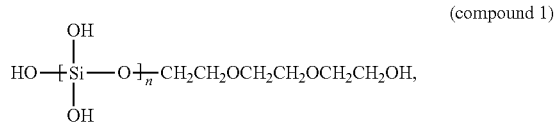
(compound 1)

wherein, n is an integral ranging from 1 to 10000.

17. An aluminum electrolysis capacitor, comprising the electrolyte according to claim 16.

* * * * *